Feb. 7, 1961 W. BERMAN 2,970,372
METHOD AND MACHINE FOR MAKING BELTS
Filed Feb. 6, 1956 11 Sheets-Sheet 1
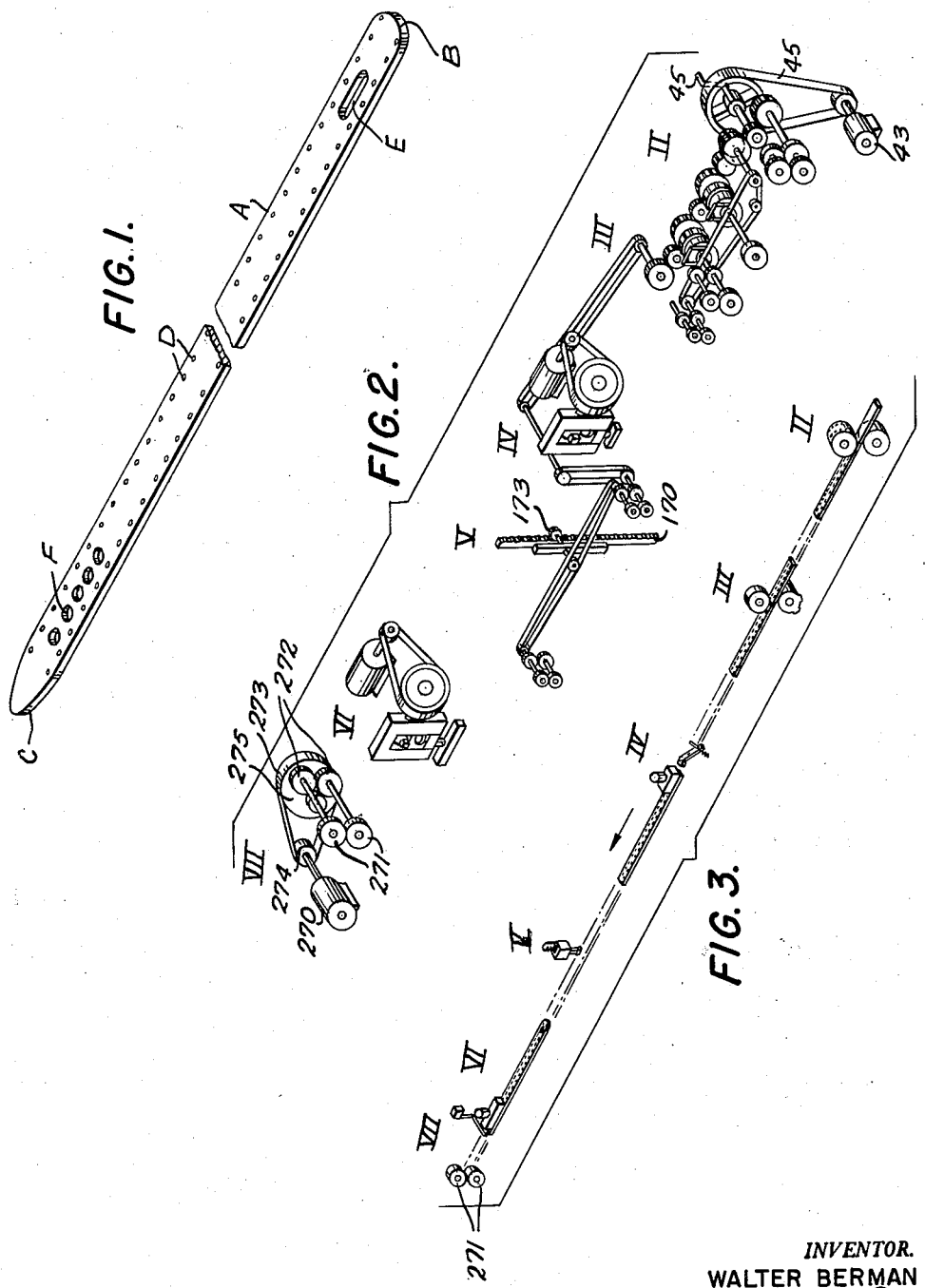
INVENTOR.
WALTER BERMAN
BY
ATTORNEY Feb. 7, 1961 W. BERMAN 2,970,372
METHOD AND MACHINE FOR MAKING BELTS
Filed Feb. 6, 1956 11 Sheets-Sheet 2

INVENTOR.
WALTER BERMAN
BY
ATTORNEY

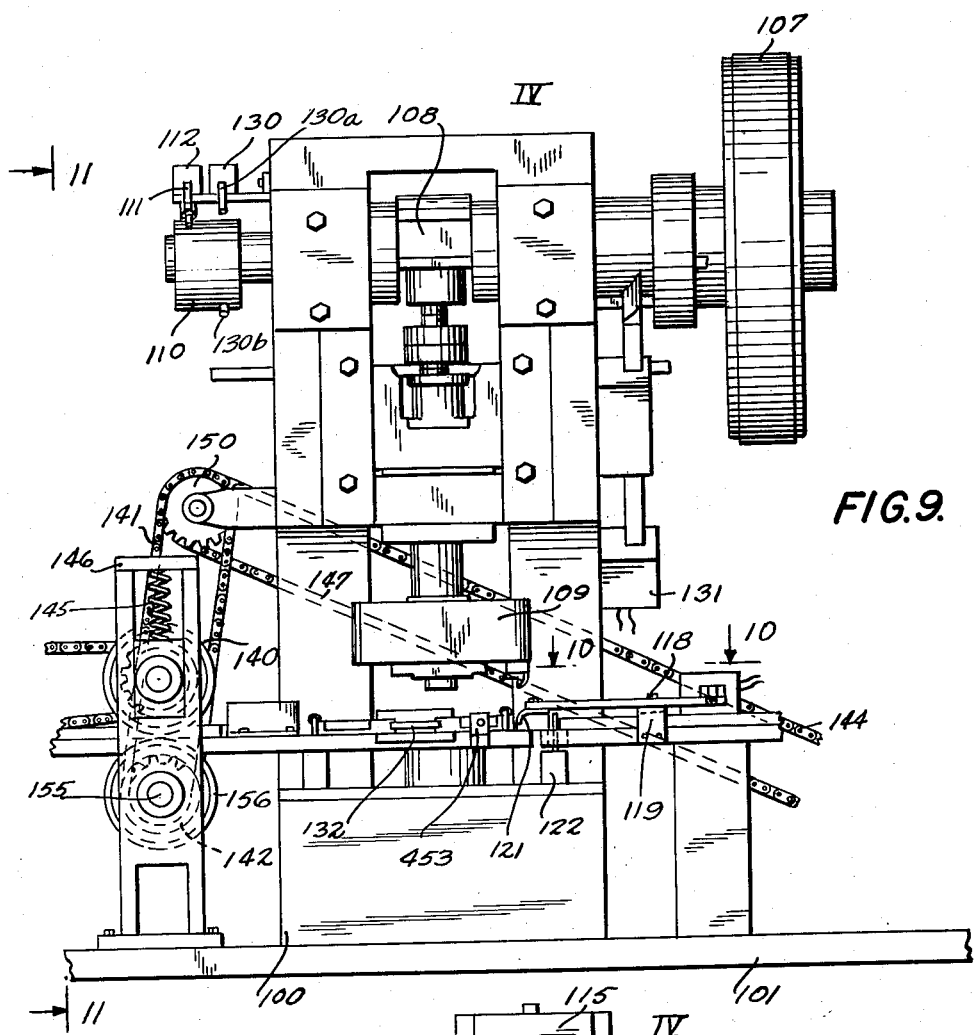

Feb. 7, 1961 W. BERMAN 2,970,372
METHOD AND MACHINE FOR MAKING BELTS
Filed Feb. 6, 1956 11 Sheets-Sheet 6
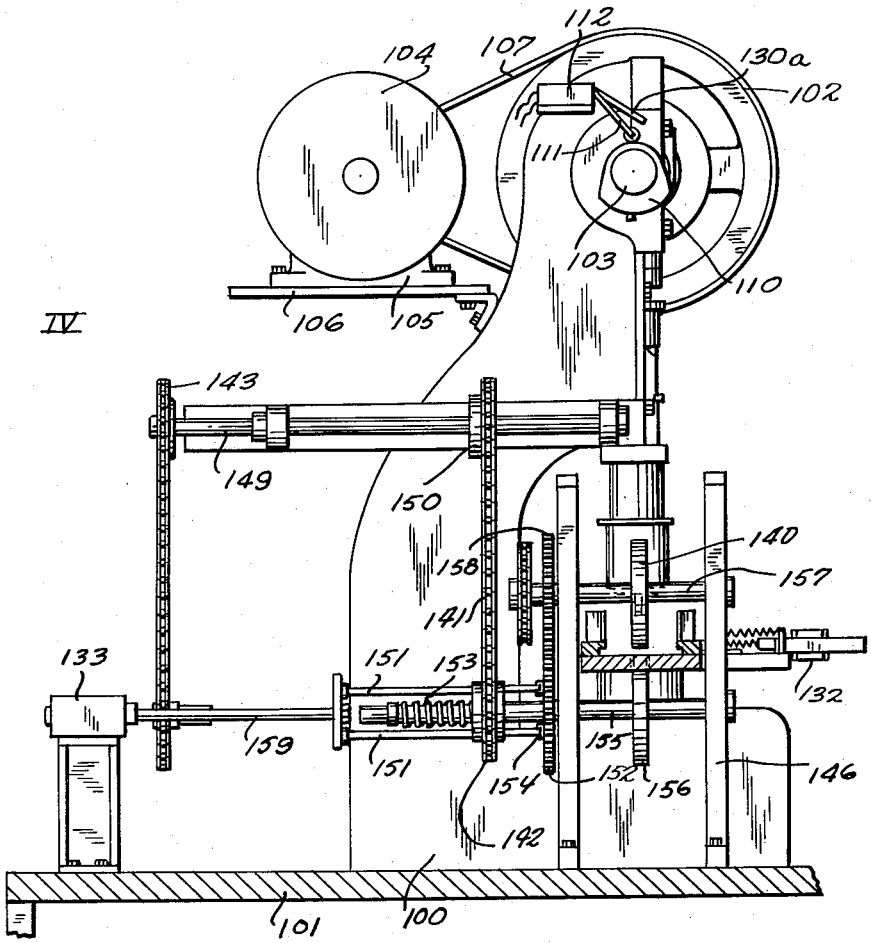
FIG. 11.
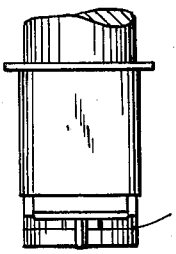
FIG. 12.
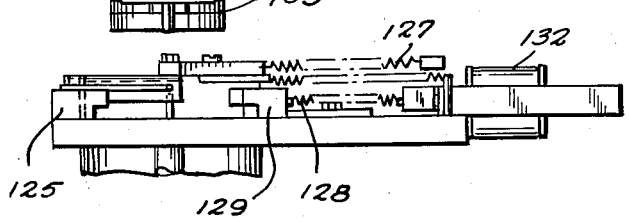
INVENTOR.
WALTER BERMAN
BY
ATTORNEY Feb. 7, 1961  W. BERMAN  2,970,372
METHOD AND MACHINE FOR MAKING BELTS
Filed Feb. 6, 1956  11 Sheets-Sheet 7

INVENTOR.
WALTER BERMAN
BY
ATTORNEY

Feb. 7, 1961 W. BERMAN 2,970,372
METHOD AND MACHINE FOR MAKING BELTS
Filed Feb. 6, 1956 11 Sheets-Sheet 8

INVENTOR.
WALTER BERMAN
BY
ATTORNEY

Feb. 7, 1961 W. BERMAN 2,970,372
METHOD AND MACHINE FOR MAKING BELTS
Filed Feb. 6, 1956 11 Sheets-Sheet 9

INVENTOR.
WALTER BERMAN
BY
ATTORNEY

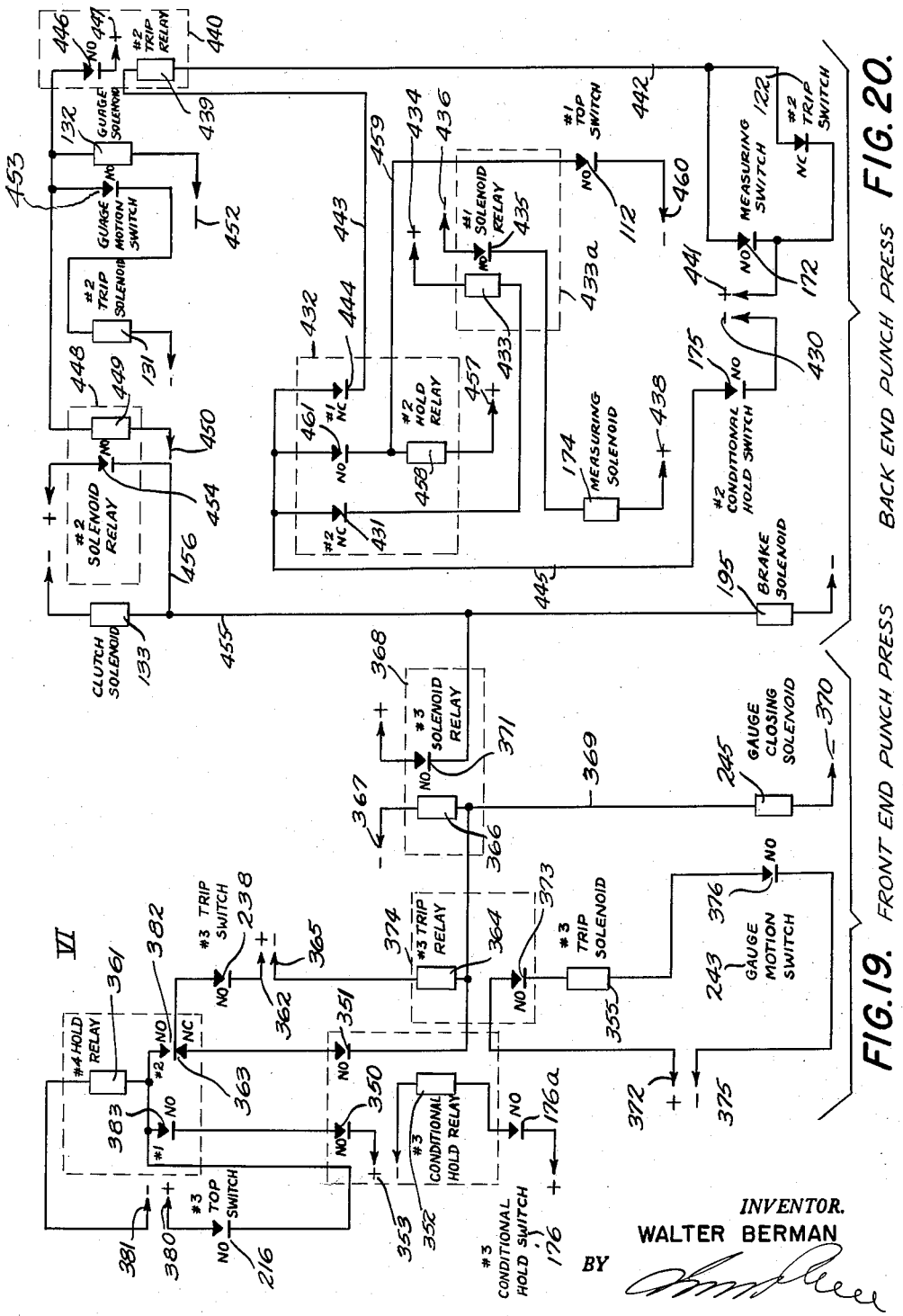

2,970,372
METHOD AND MACHINE FOR MAKING BELTS

Walter Berman, 97 Wooster St., Yonkers, N.Y.

Filed Feb. 6, 1956, Ser. No. 563,689

16 Claims. (Cl. 29—407)

The present invention relates to a method and machine for making belts and it particularly relates to a continuous embossing, back-stamping, punching, re-sizing, bevelling, centering and belt processing system.

Although not relating thereto, it will be particularly described in connection with mechanisms and procedures for taking strips of leather or fabric and by successive operations converting them into belts for men and women or children by successive, automatic, and synchronized embossing, back-stamping, punching, re-sizing, bevelling, and feeding procedures.

It is among the objects of the present invention to provide a novel belt making machine which will take strips of fabric, leather or other materials, and without manual intervention, and with a minimum of hand labor, decorate the front and print the back thereof, and at the same time shape both the front and the back so that the strip will come out as a complete belt ready for attachment to buckles and other findings.

Another object of the present invention is to provide a belt making system including an automatic front and back end punching arrangement performing the buckle cooperating openings in a belt structure which will be automatically synchronized to give assurance that the belt will be properly sized and that the punched openings will be properly applied in accordance with setting for the particular belt style and also so that the openings or punch holes are made substantially automatically without minimum intervention and in a continuous high production rate operation.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In the operation of the present invention a strip of leather fabric or other belt making material is first fed into an embossing machine and the belt is passed under the embossing roller, which is heated and embosses the design on the belt section. This embossing operation may also shape the fabric or strip of leather into the designed belt shape by heat and pressure, and inlays may be also placed into the belt structure simultaneously with the embossing from paper leaf.

The strips of leather or fabric to be formed into the belt may be automatically or continuously fed into the embossing operation from a pile or supply of belt sections of desired length.

Then the embossed leather passes through a stamping operation where it is subjected to operation of a stamping roller.

The stamping roller is provided with inking means which may consist of a felt ink pad which will be applied to the printed portions of the roller or a heated roller and paper leaf.

In the preferred form, the belt is moved to the desired position and then a micro switch arrangement will cause the stamping roller to be applied to the belt.

Normally, this stamping is done on the underside of the belt with an additional roller on the top of the belt applying the pressure.

The next operation is the back-punching die operation, which forms the necessary buckle additional operations in the back end or rear end of the belt.

In this operation the belt will be advanced until the front or forward end thereof actuates the micro switch or back trip switch. During this operation, it will pass over a conditional and hold switch, which will actuate a measuring rack closing a solenoid.

Subsequently, the back end of the belt passes by the back trip switch which is closed.

As a result of this crossing of the back trip switch, the clutch control roller which has been advancing the belt is stopped and a solenoid actuated brake presses down the belt which stops it instantly. This may also be accomplished by a magnetic brake acting on the shaft of the advancing rollers.

If the belt has been stretched or is not of proper length, the first conditional and hold switch is tripped causing a measuring rod to be actuated to correct the measuring position.

When this point has been reached, a measuring switch is tripped or closed and this accomplishes the same action as if the back trip switch had been closed.

When the action has thus been stopped and the belt is held in fixed position, the back punch machine is actuated to punch the back or rear end of the belt, cutting off any excess marginal material and also making any necessary holes or slots.

Associated with the punch die is a flipper arrangement which will sweep the excess material off the punching table, which excess material has been left as a result of the punching operation.

This operation will then close a top switch by a cam arrangement, releasing the solenoid brake and setting the advancing rollers into motion to move the belt section to next front punch position.

The belt will then be advanced to the point or front end punching machine and in this movement it will pass over a second conditional and hold switch which will be closed.

The front end of the belt and/or point end of the belt in passing through this motion will pass under a lever arm which will close the point trip switch.

When this occurs, the clutch control roller is stopped and the solenoid control brake will again press down on the belt stopping its motion.

At this point a gage is actuated by solenoid to center the belt under the punching die and when the belt is centered, the clutch of the punching machine will be actuated. This punching machine will shape the point of the belt and form the necessary arrangement of buckle engaging holes.

This point or front end punching arrangement also is provided with a stripper or flipper arrangement to remove excess or punching out material.

At this point the pointing die or front end punching die will move upwardly, opening the solenoid control centering gage, lifting the solenoid actuating brake and actuating the clutch solenoid so that the clutch is engaged and the belt starts moving.

The belt section will then pass through the bevelling machine where the edges are bevelled and the finished belt is then discharged to a hopper.

The first and second clutch arrangement are worked in unison and started in the same way and have ratchet arrangements which permit them to roll in one direction only and at a predetermined speed so that the advancement of the belt will be predetermined.

However, the bevelling machine may act upon the belt at an increased speed for a most satisfactory operation. In the drive arrangement, each machine has a separate motor or a single motor may be geared or belt connected to the various elements.

For each operation, namely stamping at position, back punching and front punching at position, there will be two switches for each operation, a conditional and hold switch and a trip switch.

The conditional part of the conditional and hold switch requires that the belt be present in the position to be operated on by the stamping or punching mechanisms.

The hold part of the switch keeps the stamping or punching mechanisms out of operation until the old belt which has been previously worked on is cleared from the position into which the new belt is being fed.

In other words, the conditional and hold switches will make certain that there will be no punching or stamping until the old belt section worked upon has been progressed forward and until the new belt section is in position.

The trip switch will be actuated by the end of the belt and will cause the stamping or punching operations to take place when the belt has been progressed to the desired position.

The trip switches for the stamping and back punch operations are actuated when the back end of the belt is moved beyond the switch and releases it, the trip switch having been held down by the belt during the forward progression of the belt section to be worked upon.

With front punch, the trip switch is lifted by the front end of the belt and this will initiate operation of the front punch.

The conditional and hold switch in the stamping and front and back punching operations is held down by the belt and will be closed so that when the belt also closes the trip switch there will be a circuit completed causing the mechanism to operate.

At the same time so that there will only be one cycle per belt section the mechanism, as it is moving through one cycle, will through a cam and microswitch arrangement close a relay which opens the circuit to the mechanism involved and this keeps the circuit open through the conditional and hold switch until the back end of the belt clears the conditional and hold switch.

When the belt section clears, the whole electrical system goes back to neutral condition, and it will be ready to receive the next belt section.

The trip switches of the two punch sections also actuate simultaneously with the punch presses the clutches of the rollers which progress or move the belt sections from back punch positions to front punch positions.

The trip switch in each punch position will also actuate a brake which consists of solenoid actuated brake or a magnetic brake to stop the belt, and the belt will be held by the gauge elements so that the belt section will be correctly centered and will not move during punching.

Associated with both the front and back punches there will be the centering gauge which gauge may be electrically operated by a solenoid or mechanically operated by the downward stroke of the punch press.

When the belt section is passed through the embossing operation it may be changed in length by varying distances depending upon the material from which it is made, varying from ⅛" to 2" or more, due to lack of uniformity in tannage, thickness of leather, softness of leather and other composition factors.

It is important that the back punch operation take place at a predetermined distance from the front end of the belt.

Where there has been negligible change in length, the back trip switch may be relied upon to be released and closed when it is cleared by the back end of the belt.

However, when the belt section has been substantially lengthened it is necessary to provide an auxiliary device which will measure the length of the belt and cause back punching and removal of excess back length even when the back trip switch has not been cleared and released and closed by the back end of the belt.

This is accomplished by providing between the front and back punches a vertically reciprocating measuring rack.

The rack is actuated as soon as the front end of the belt section passes over the conditional and hold switch which is associated with the back punch.

As soon as this occurs, a solenoid will be energized to cause a sprocket to engage and to elevate the vertical rack.

The rack is provided with an adjustable or movable member the setting of which may be varied. There will also be a measuring switch functioning as an auxiliary trip switch to function instead of the back end trip switch if it is not cleared by the belt section.

The sprocket is driven by the chain which also drives the rollers which are progressing or moving the belt. The vertical rack will be moved upwardly as the belt section passes the conditional and hold switch until it has progressed a predetermined distance at which the cam on the rack will actuate the auxiliary trip switch and stop the belt and cause the back punch to operate even though the back end trip switch has not been released.

Sufficient extra material will then be simultaneously punched off the back end of the belt section together with formation of the slot and/or holes for snap fasteners or rivets to resize the belt.

Instead of a vertical rack with a cam and measuring switch, it is also possible to use a rotary counter which will roll on the belt and measure the forward movement or length of the belt and at a predetermined setting close an internal switch which will act as an auxiliary trip switch.

The belt in its passage into the embossing position may also load a condenser which charge will act as a control in connection with a similar condenser at the back punch position to release the punch mechanism when a similar length of belt has moved past the back end trip switch. In this case the back end trip switch will move from one closed and open position to a second opposite closed and open position.

To remove the excess back punch material from the table of the back punch press, the back punch press as the die moves upwardly will close a switch through a cam mounted on the crank shaft and cause an oscillation of a flipper or sweep to remove the punched off pieces.

For the front punch press there is provided a hammer which will strike the front end of the belt as it passes from the front punch press table striking off the punched off front portion which is knocked down out of position. This hammer is actuated by a solenoid which in turn is actuated by the forward movement of the belt after the front punching has taken place.

In advancing the belt through the machine there will be provided five sets of advancing rollers, one set acting during the embossing operation, a second set following the stamping operation, both the first and second sets being in constant motion; a third set following the back punch; a fourth set preceding the front punch, which third and fourth sets are connected to move together through gearing or a sprocket arrangement and said third and fourth sets being controlled by a clutch which stops the rollers only during a front or back punch operation following and preceding they are continuously in motion; and a fifth set which rotates continuously at a higher speed than the third and fourth sets and puts the belt between the side bevelling knives.

The third and fourth sets of rollers are ratcheted so that the belt may be pulled through the side bevelling position more rapidly than they will progress the belt at their own rolling speed.

The various operations may be changed in sequence since they are each independently controlled.

For example bevelling may precede embossing in which case there would be a pair of take off rollers after the front punch. The front and back punches may be interchanged.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims herein appended.

In the drawings wherein like reference characters denote corresponding parts throughout the several views:

Fig. 1 is a top perspective view showing the belt after the embossing, punching, bevelling and other operations have been accomplished.

Fig. 2 is a top perspective diagrammatic layout of the machine showing the embossing, stamping, back punching, front punching, and bevelling mechanisms in their sequential positions.

Fig. 3 is a top perspective view showing the successive operations as applied to the belt sections of the mechanisms of Fig. 2.

Fig. 9 is a front elevational view of the back punch mechanism.

Fig. 10 is a fragmentary horizontal transverse sectional view upon the line 10—10 of Fig. 9.

Fig. 11 is a side elevational view of the back punch arrangement taken from the line 11—11 of Fig. 13.

Fig. 12 is a side elevational view showing the centering gage which is shown in a smaller scale at the lower right of Fig. 11.

Fig. 19 is a diagrammatic layout of the circuit for controlling the front end punch press arrangement.

Fig. 20 is a diagrammatic circuit arrangement for controlling the back end of the punch arrangement.

Referring to Fig. 1 there is shown a finished belt section A, having the cut out back end B, the punched out front end C, the buckle slot, the sides of the belt are embossed as indicated at D, and the underface of the belt not shown may be suitably stamped. The sides or edges of the belt may also be bevelled. The back end of the belt is provided with a slot E and with five fly or adjustment holes F.

Referring particularly to Figs. 2 and 3, there is shown the various steps in the mechanical operation consisting of an embossing at II, the stamping at III, the back punching at IV, a measuring rack arrangement at V, a front punching arrangement at VI, and a bevelling arrangement at VII.

Figure 4:
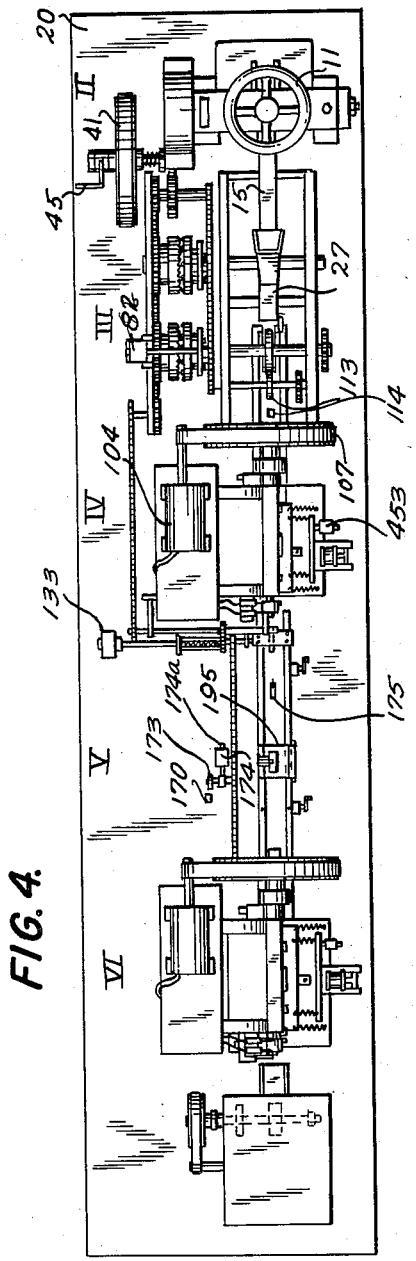
Fig. 4 is a top plan view of the entire machine upon a relatively small scale as it may be mounted upon the table.
Figure 5:
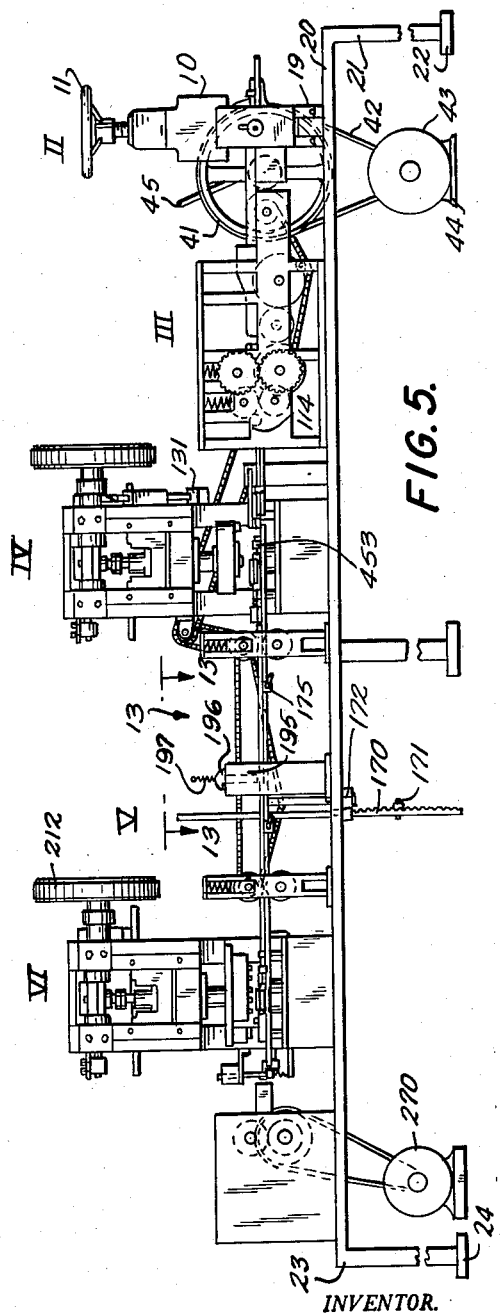
Fig. 5 is a side elevational view of the complete machine.
Figure 6:
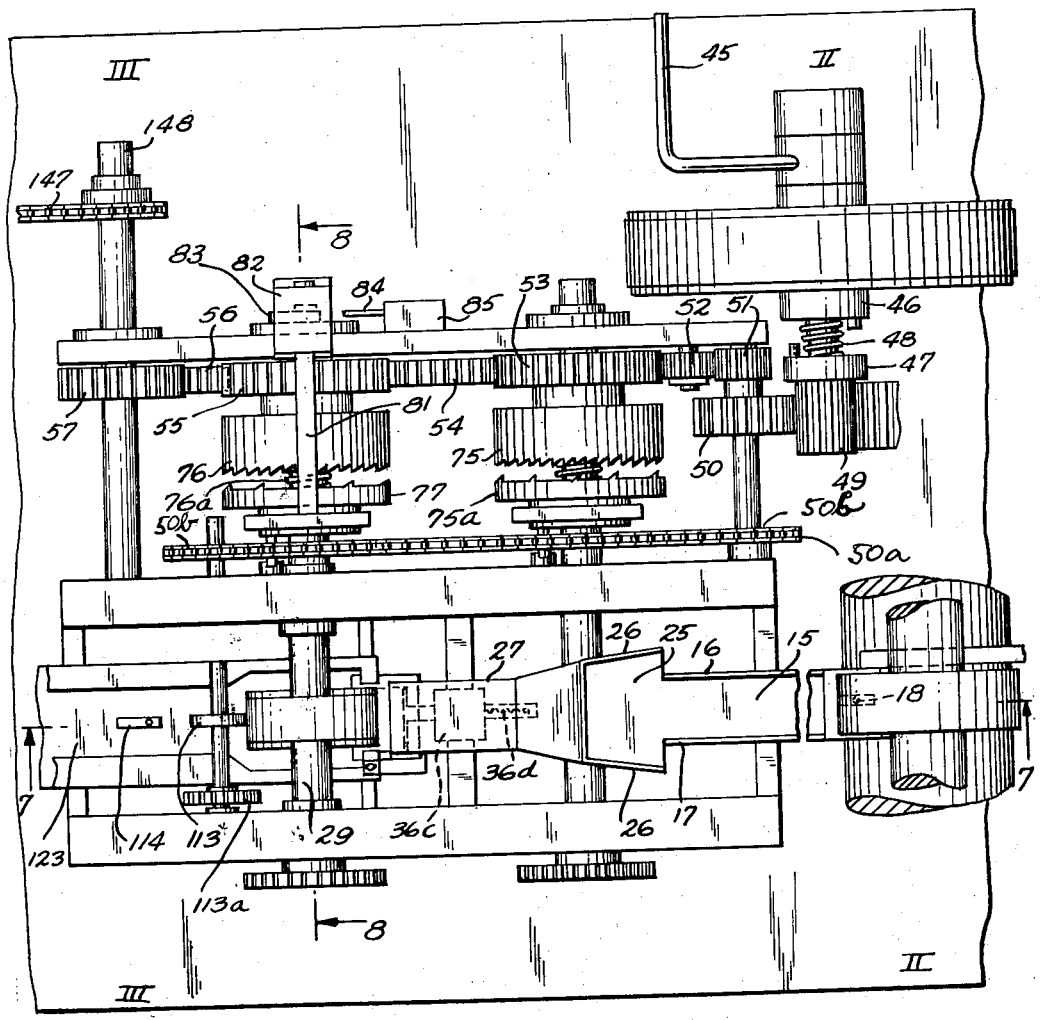
Fig. 6 is a top plan view of the lead end of the machine showing the stamping and embossing mechanism.
Figure 7:
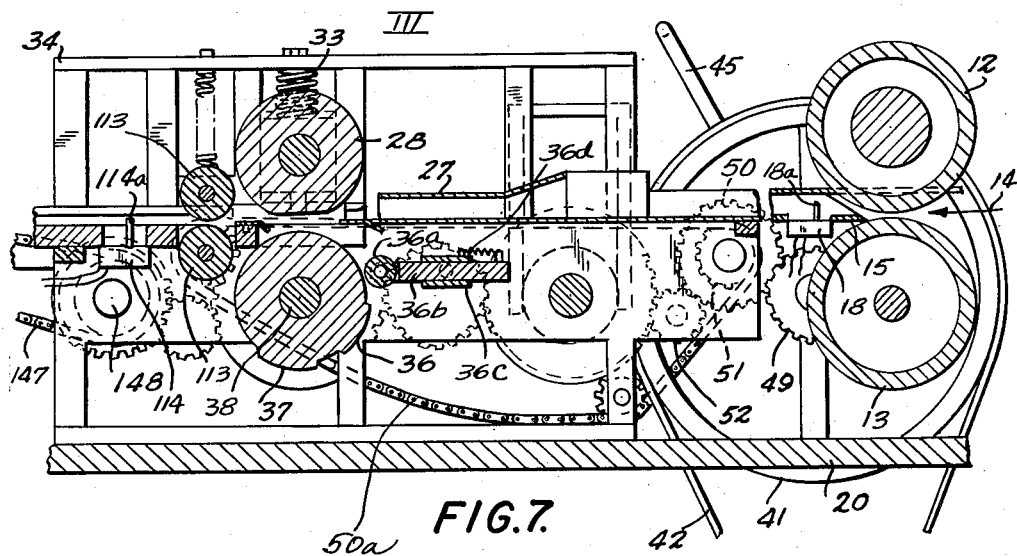
Fig. 7 is a transverse vertical sectional view upon the line 7—7 of Fig. 6.
Figure 8:
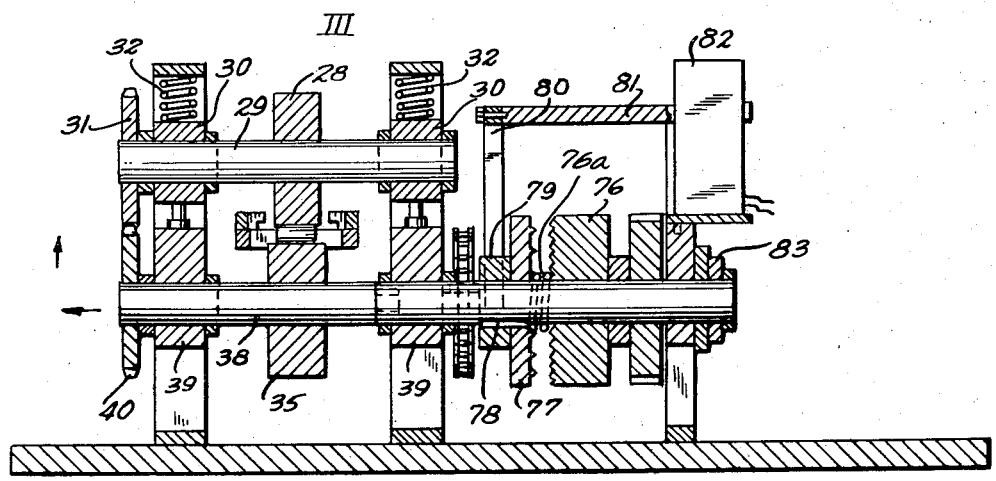
Fig. 8 is a transverse vertical sectional view upon the line 8—8 of Fig. 6.

Referring to Figs. 4 and 5, the embossing operation II and the stamping operation III are shown in a small scale in Figs. 4 and 5, and in an enlarged scale in Figs. 6 to 8.

This mechanism includes the embossing machine frame 10, having the adjustable pressure wheel 11, which carries the upper embossing roller 12, and the lower embossing roller 13.

The belt will be fed in between the embossing rollers, as indicated by the arrow 14 into the tray or guideway 15, which will have the side flanges 16 and 17 to gage the width of the belt.

Projecting upwardly at the beginning of the guideway will be the trip switch 18, which will be pressed down or actuated by the introduction of the poine end of the belt into the guideway 15.

The embossing arrangement may be supported by the legs 19 upon the table 20, which in turn has the legs 21 and the floor block 22 at the entrance end.

It will also have the leg 23 and the floor block 24 at the exit end (see Fig. 5).

From the guideway 15 the embossed belt section will be passed into the funnel member 25, having the converging side walls 26 and into the covered section 27. From the covered section it passes into the bottom stamping arrangement III.

The bottom stamping arrangement consists of a top stamping pressure roller 28 driven on the shaft 29, having spring pressed bearing blocks 30 and driven through the end gear 31.

The springs 32 react against the top plan 33 of the frame structure 34. The bottom stamping roller 35 has a type 36 and 37 or other material to be printed upon its face and it is driven on the shaft 33 having the bearing 39.

The shaft 38 will drive the gear 40 which meshes with and drives the gear 31.

The gearing arrangement for the upper and lower stamping rollers 37 and 28 are driven from the fly wheel 41 which in turn is driven by a belt 42 from the motor 43 mounted on the floor at 44.

The fly wheel 41 is provided with the hand clutch control 45. The clutch elements 46 and 47 are separated by the spring 48.

The clutch arrangement drives the gearing 49, 50, 51, 52, 53, 54, 55, 56 and 57 as shown in Fig. 6.

The gears 53 and 55 are associated with the toothed clutch arrangements 75 and 76.

The toothed clutch arrangement 76 is mounted loosely upon the shaft 38, whereas the plate 77 is keyed to the shaft 38, as indicated at 78 in Fig. 8.

Associated with the toothed plate 77 is the back disk 79, which has an upwardly extending arm 80. The arm 80 has a bar 81 which is actuated by the solenoid 82.

On the shaft 38 is also positioned the cam 83 which operates the arm 84 of the microswitch 85 (see Figs. 6, 7 and 8).

The cam 83 will cooperate with the micro switch 85 to stop operation of the stamping operation after one complete revolution until the next belt is in position.

These stamping rollers at position III will normally imprint the back of the belt with suitable identified indicia.

From the stamping position III the belt then passes to a back punch position where the slot E of Fig. 1 is punched thereon and excess back material is removed, said punching position being shown in small scale in Figs. 2, 4 and 5, and in large scale in Figs. 9, 10, 11 and 12.

In the back punch position there is a punch press structure 100 (see Figs. 9 to 12) which is mounted upon a table 101 and which is provided with the fly wheel 102 and the main shaft 103 driven from the motor 104.

The motor 104 is supported by the base 105 on the table 106 (see Fig. 11).

The fly wheel is driven from the motor 104 by the belt 107 and through a suitable eccentric or cam arrangement at 108.

The punch head 109 will be reciprocated. At the end of the shaft 103 (see Fig. 11) there is positioned a cam 110, which will act upon the arm 111 of the micro switch 112 to stop the punch press after one complete cycle.

The belt will be advanced from the stamping position III to the back punch position IV by means of the rollers 113 away from the stamping position III.

In Fig. 7 in the stamping section, switch 18 acts as the trip switch and switch 114 acts as the conditional and hold switch. The hold set switch 85 in Fig. 6 will stop the stamping mechanism after one rotation.

The structure shown in Fig. 10 is actuated by means of the solenoid 115 (see Fig. 10) which acts through the link 116 upon the arm 117.

The arm 117 is pivotally connected at 118 to the block 119 and also at 120 to the element 121.

The back trip switch 122 is positioned in the runway 123.

Referring to Fig. 12 the top springs 127 will pull the gage out in open position, while the bottom springs 128 will push the gage in to directly press it against the side gage member 125, which will center the belt in connection with the punch press head 109 and make certain that the belt slot is correctly positioned in the back end of the belt structure.

The arm 117 will act as a flipper to flip away any loose or excess material which has been punched off.

In the operation the belt will ride along from the stamping position III being pressed forwardly by the passing or progressing rollers 113 over the conditional and hold switch 114 as it enters the runway 123 under the punch press 109.

The solenoid 132 actuates the centering gage of Fig. 12 causing the moveable head 129 to move the belt against the fixed head 125 (see Fig. 12).

In Fig. 9 the back punch will have a back trip switch 122, a conditional and hold switch 175, a top switch 112 and a flipper switch 130. The back trip switch 122 in conjunction with the conditional and hold switch 175 will operate the solenoid 131 in Fig. 9 and the gage solenoid 132 and the clutch solenoid or magnetic clutch 133.

It is desirable that the centering gage on the front and back punches close before the punch press starts its downward motion. This control is shown at the gage motion switch 243 in Fig. 16 for the front punch and may also be used in the back punch of Figs. 9, 11 and 12. It is important that the belt be centered before the punch head strikes the belt and this will assure this sequence of operations.

The drive sprocket chain 147 (see Figs. 9 and 11) will be driven from the shaft 148 (see Figs. 6 and 7). The chain 147 drives sprocket 143 which drives shaft 149. The shaft 149 drives the sprocket wheel 150 which drives the chain 141. The chain 141 will drive the sprocket 142 which rotates the bars 151 (see Figs. 11 and 13).

The bars 151 and the sprocket 142 are pushed to the right toward gear 152 by the coil spring 153. These two bars 151 abut against the two pins 154 attached to the gear 152.

The gear 152 is attached solidly to the shaft 155 which drives the lower roller 156. The upper roller 140 rides on the shaft 157 which is driven by gear 158 which in turn is driven by gear 152.

The clutch as shown in Fig. 11 disengages upon energizing of the solenoid 133 which pulls leftwardly in Fig. 11 on T-bar 159, which in turn pulls the bars 151 and disengages bars 151 from pins 154.

The clutch control roller system and the brake 196 will hold the belt still while it is being punched by punch head 109.

An alternative arrangement for correctly positioning the belt is shown at position V in Figs. 2, 4 and 5.

Figure 14:
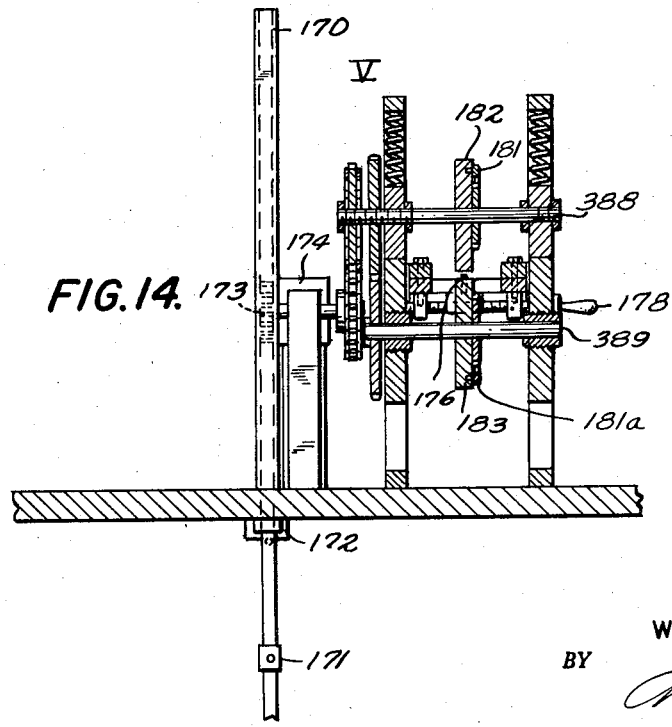
Fig. 14 is a transverse vertical sectional view taken upon the line 14—14 of Fig. 13.

At position V there is provided a vertically reciprocatory measuring rack 170, having a measuring cam 171 thereon and a measuring switch 172 (see Fig. 14).

This measuring rack is associated with a pinion or gear 173 (see Figs. 13 and 14) and a solenoid 174. On each side of the arrangement is positioned the second conditional and hold switch 175, and the third conditional hold switch 176.

The manual adjustments 177 and 178 serve to adjust the side guides or gages 179 and 180 in respect to each other depending upon the width of the belt.

The ratchet arrangement is associated with the rollers 182 and 183 which causes movement of the belt to the next position.

Figure 13:
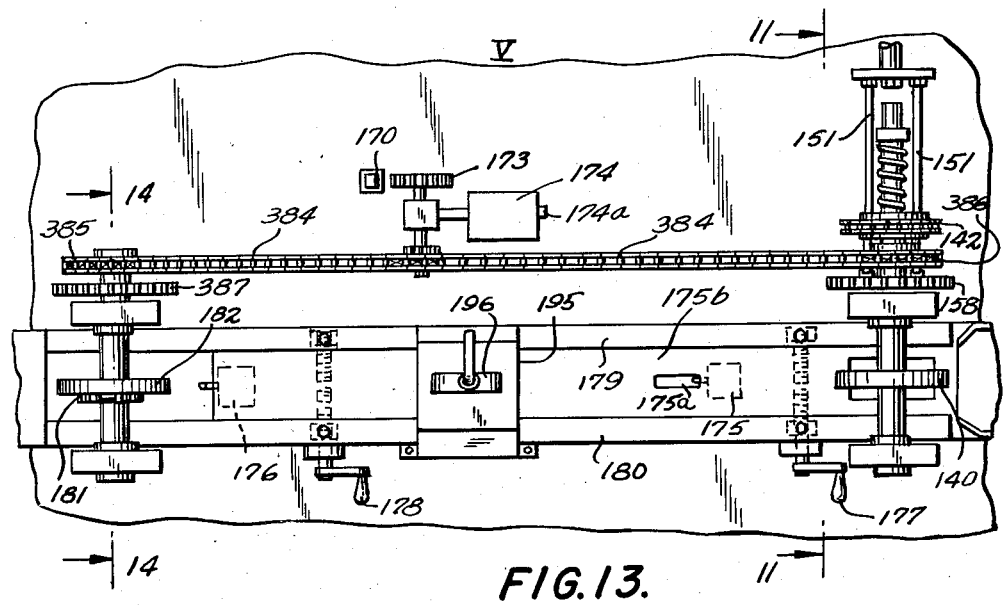
Fig. 13 is a top plan view of the solenoid control brake arrangement, which is shown in a small scale in the middle of Fig. 5, and which is taken from the line 13—13 of Fig. 5.

The measuring rack arrangement as indicated at 170 in Figs. 13 and 14 is particularly useful where the belt has been stretched or is of varying length and it serves as an alternative means of stopping and punching of the belt.

For example, where the first conditional and hold switch 175 of the back punch of Fig. 6 is tripped, the measuring rack 170 will be elevated to correct position, and when this has been accomplished the measuring switch 172 of Fig. 14 will be tripped and closed, and this will accomplish the same action as the back trip switch 122 of the back punch when it is closed.

When the action has been stopped by either the back trip switch 122 of Fig. 10 or the measuring switch 172 of Fig. 14, the clutch of the back punch machine at position IV will be actuated to punch the back of the belt at position B of Fig. 1, and the excess material will be flipped off by means of the flipper bar 117 of Fig. 10.

The brake solenoid and brake shown in position 195 normally acts to hold the belt in position during the punching operation.

The belt section will also be held by the solenoid or magnetic brake, such brake being shown at 195—196—197.

The reciprocatory member 196 has a spring 197 which pulls it upwardly while the solenoid will pull it downwardly against the belt section being punched.

The top switch arm 111 when it contacts the cam 110 will close the #4 hold relay of Fig. 19 and thereby release the solenoid 133 of the clutch 151—154—159 of Fig. 11, thereby setting rollers 140—156 in motion and also the rollers 181 in the fourth set of the passing rollers at the left of Fig. 13.

The top switch 111 also through the relays of Fig. 19 releases the brake 195—196—197 and the solenoid 131 of Fig. 9 to stop the motion of the ram or punch press.

Figure 15:
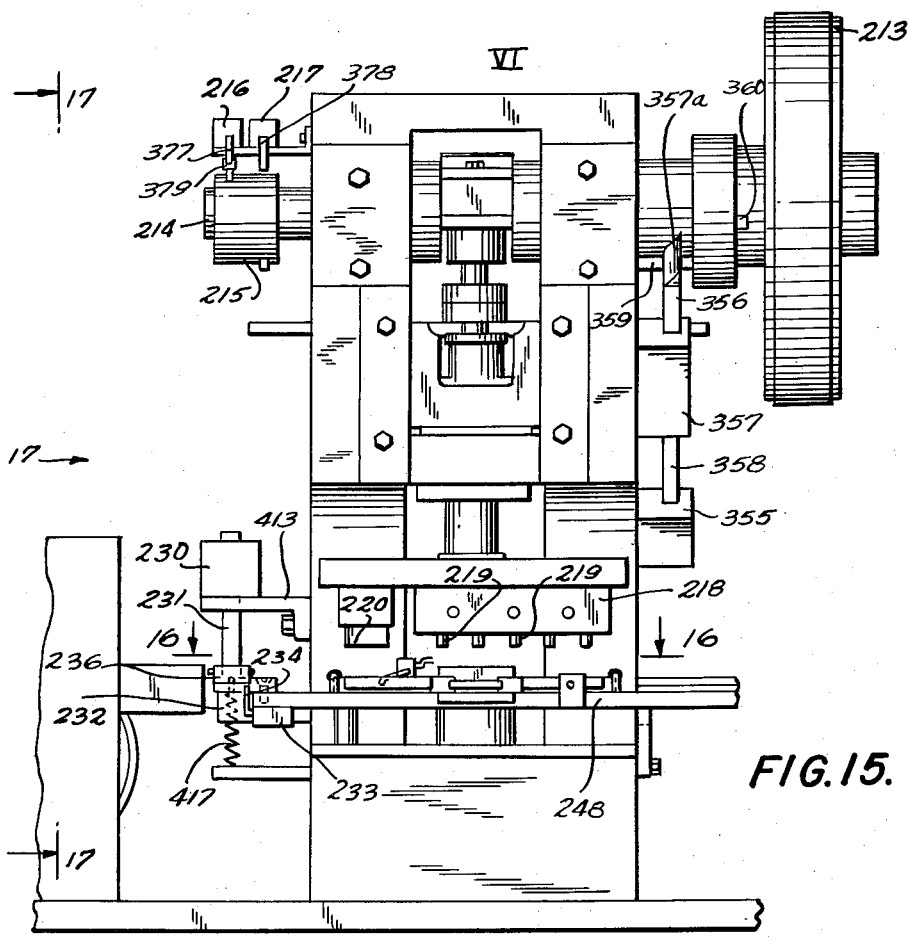
Fig. 15 is a front elevational sectional view of the point punching machine upon an enlarged scale as compared to Figs. 1 to 5.
Figure 16:
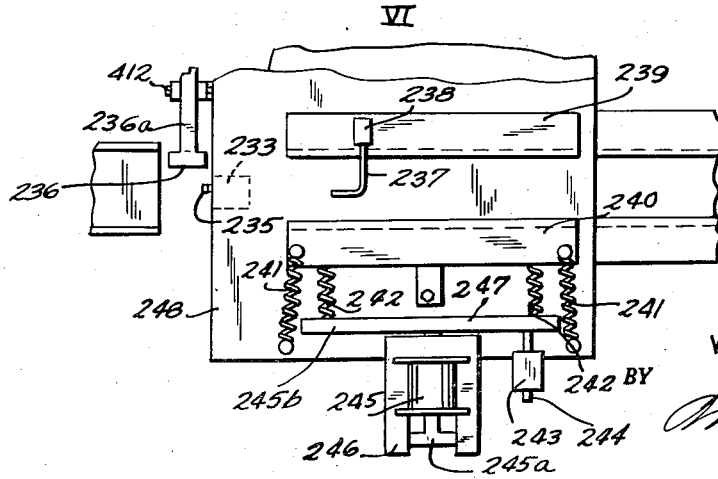
Fig. 16 is a transverse horizontal section view looking downwardly taken upon the line 16—16 of Fig. 15.
Figure 17:
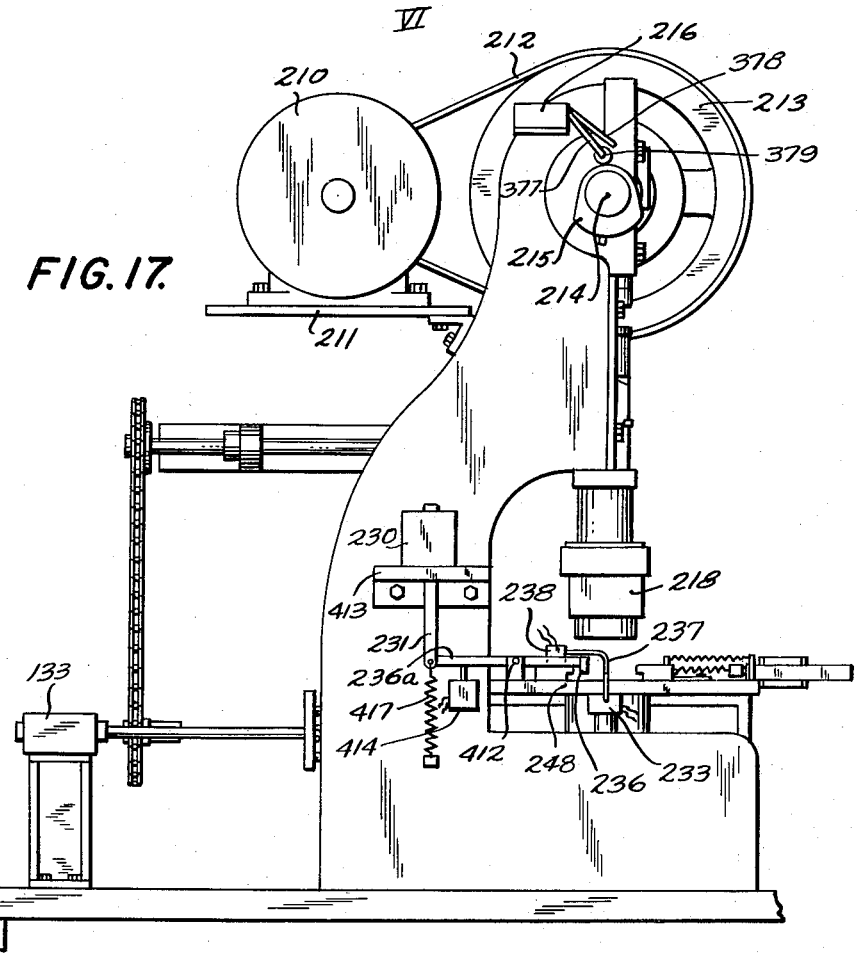
Fig. 17 is a side elevational view of the point punching machine taken upon the line 17—17 of Fig. 15.

This punch mechanism is shown in small scale in Figs. 2, 4 and 5, and in enlarged scale as shown in Figs. 15, 16 and 17.

As shown in Figs. 15 to 17 the motor 210 on the table 211 will drive the fly wheel 213 through the belt 212.

The shaft 214 carries the cam 215 which operates the top switches 216 and 217.

The reciprocating punch head 218 has a plurality of punch points 219, and also an end punch 220.

The end punch 220 will shape the front end C of the belt section of Fig. 1. On the other hand the punch elements 219 will form the buckle engagement opening or adjustment openings F of Fig. 1.

The hammer solenoid arrangement is shown best at the left of Fig. 15, which has a hammer solenoid 230 with an arm 231, which operates a motion switch 232.

The hammer switch 233 has an upwardly projecting arm 234. The hammer switch 233 has a projection tab 235 and hammer 236 as shown at the left of Fig. 15.

The second trip switch 237 is shown as being mounted on the box 238 on the fixed positioning member 239.

The adjustable gage or positioning member 240 is provided with the top springs 241, and the bottom springs 242, and with the gage motion switch 243 for the presser member or pin member 244 (see Fig. 16).

Referring to Fig. 16, there is shown the solenoid 245 positioned in the yoke 246, which has a T-member 247.

The gage as shown in Fig. 16 has a rear member 239 which is solidly fixed at a predetermined setting to the table 248. When the solenoid 245 is energized it pushes the T-member 247 which pushes the springs 242 which in turn overcomes tension of springs 241 and presses gage member 240 against the belt centering the same. When the solenoid 245 is deenergized the springs 241 pull the plate 240 to the bottom of Fig. 16.

The arrangement shown in Fig. 16 will correctly position the belt under the front end punch press at position VI.

The brake solenoid 195, 196 and 197 of Fig. 13 also serves to stop the belt when positioned under the front punch press at position VI.

When the belt is in position under the punch press at position VI, the belt will be centered as shown in the arrangement in Fig. 16, and immediately thereafter the punching machine will be caused to operate.

The punch press as shown at 219 and 220 will punch both the point and the five holes.

Figure 18:
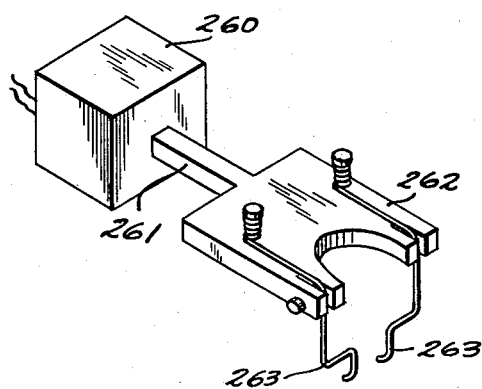
Fig. 18 is a top diagrammatic view of an alternative of stripper arrangement.

The punched out material may then be stripped off, as for example by an arrangement as shown in Fig. 18.

In the arrangement of Fig. 18 there is a strip of solenoid 260 having an arm 261, which operates a plate 262 with depending fingers 263.

This stripper action is designed to take place just as the die 219 and 220 comes up.

As the dies 219 and 220 come up, the gage solenoid 243 and the clutch solenoid 133 open together and the belt will start moving. The belt itself may, if desired, push off the excess piece and the belt will then enter the bevelling machine at position VII, where the edges of the belt will be bevelled.

It will be noted that each position or each mechanism including the embossing machine at position II, the back punch machine at position IV, the front punch machine at position VI, as well as the bevelling machine at position VII have depending, direct motors, the motor for the embossing machine being indicated at 270 at position VII of Fig. 2.

The bevelling machine, as shown in Figs. 2, 4 and 5 drives the bevel rollers 271 from the drive rollers 272, which in turn are driven from the belt 273 and the motor pulley 274.

Figure 21:
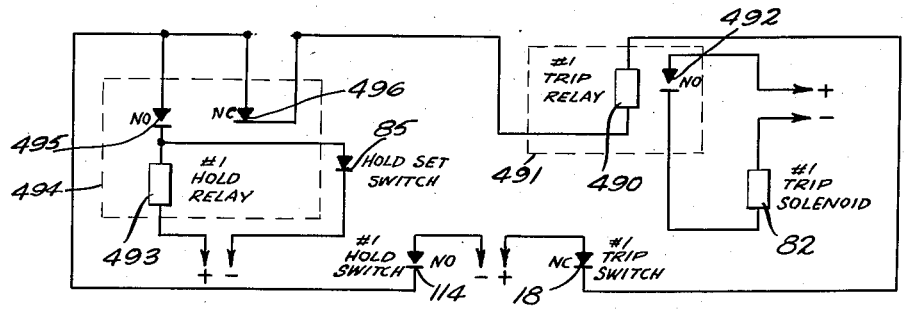
Fig. 21 is a diagrammatic circuit arrangement for the stamping section.
Figure 22:
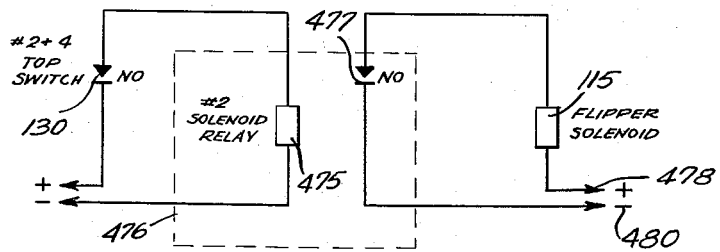
Fig. 22 is a digrammatic circuit arrangement for the front and back end ejection control for operating the strippers.
Figure 23:
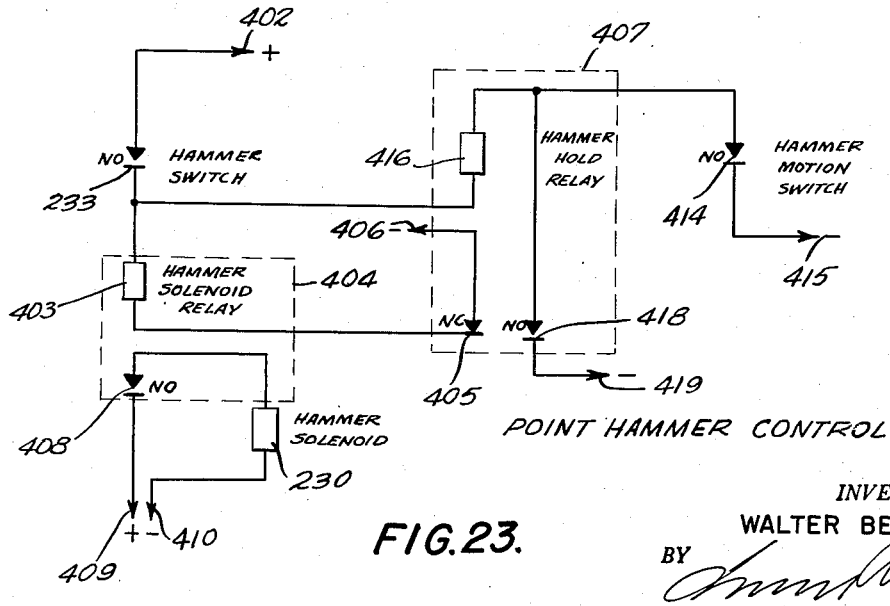
Fig. 23 is a diagrammatic layout of the circuit for the point hammer control arrangement.

Referring to the control electrical circuits, these are shown best in Figs. 19 to 23, and it will be noted that diagram of Fig. 19 shows the arrangement for the front end punch press, the diagram of Fig. 20 shows the back end punch press, the diagram of Fig. 21 shows the stamping section, the diagram of Fig. 22 shows the front and back end ejection control, and the diagram of Fig. 23 shows the point hammer control.

In the circuit arrangement of Figs. 19 to 23 the switch and relays may be changed in functioning position and operation.

The machine will operate even though the switches are differently positioned.

The switches may be micro switches, photoelectric cells, electro static or magnetic switches.

Instead of relays it is possible to use a two single action switch setup which may be shut on and off by a cantilever arm switch actuated by motion of either the front or back punch press or the stamping mechanism.

In Fig. 19 there is shown a control circuit for the front punch press operation at position VI in Figs. 2 and 3 and in Figs. 15 to 18.

In Fig. 19 the conditional and hold switch 178 when closed by advancement of the belt section of Fig. 1, which is being advanced to front end cut-off position by the rollers 140—156 (see Figs. 11 and 13), and just before it is picked up by the rollers 182—183 (see Figs. 13 and 14), will close the switch 176 which will energize the coil 352 of the relay 353 and close the contacts 350 and 351.

The closure of the contacts 351 will set up a circuit reader to allow trip switch 238, which will energize the solenoid 353, to trip the clutch 356 (see Fig. 15). The box 357 will act as a guide to control movement of the clutch bar 358.

The clutch pin 359 will move to the right under influence of an internal spring and will notch in the recess 360 when the clutch bar 358 is moved downwardly by the solenoid 355.

The contacts 350 will set up a circuit for the hold relay 361 (see Fig. 19) which will stay in this position until the belt has cleared the conditional and hold switch 176 and trip switch 238.

The belt section of Fig. 1 will be advanced under the trip switch 238 and closes the trip switch 238, having the lever arm 237. This lever arm 237 will be moved aside or lifted by the advancing belt section to close the trip switch 238. This will set up the circuit from lead in 362 through the switch 238, the contacts 363, the contacts 351, the #3 trip relay coil 364 to minus side 365 and also through the coil 366 of the solenoid relay 368 to the minus side at 367 and also through the line 369 through the gage closing solenoid 245 (see Fig. 16) to the minus side 370.

The solenoid relay 368 will control through contacts 371 the clutch solenoid 133 (see Figs. 4, 11, 17 and 20) which clutches are for both the front end and back end positions at IV and VI.

The solenoid relay contacts 371 will also energize the brake solenoid 195 (see Figs. 4, 5, 13 and 20).

Now, when the belt is in position under the front end punch press at position VI, the clutch solenoid 133 pulls the rod 159 and the pins 151, disengaging them from the pins 154 in the gear 152 (see Fig. 11), and furthermore the brake solenoid 195 will force down the brake rod 196 so that its lower end strikes the belt section of Fig. 1.

At the same time the gage closing solenoid 245 of Fig. 16 will push the T rod 245a and 245b and the springs 242 and the gage bar 240 to center of the belt.

As the bar 245b moves away from the switch 243, the spring loaded rod 244 of the switch moves in the same direction closing the switch 243 (see Fig. 16).

Now, turning back to Fig. 19, this will energize the solenoid 355 in circuit from plus 372 through closed contacts 373 of the trip relay 374, through the solenoid 355 and back to minus at 375, through the contacts 376 of gage motion switch 243.

When the trip solenoid 355 is thus energized it pulls the clutch bar 358, releasing the clutch pin 359, which engages the notch 360 and starts the punch press VI in its cycle.

In the cycle of the punch press the cam 215 on the shaft 214 will move the arm 377 having the roller 379 to close the switch 216 (see Figs. 15, 17 and 19) which will establish a circuit from plus 380 through hold relay solenoid 361 back to minus 381.

The energization of solenoid 361 opens contacts 363 which break or open the circuits to trip relay 374, trip solenoid 355, and also it breaks the circuit to the solenoid relay 368, which breaks the circuit to the clutch solenoid 133 and the brake solenoid 195 and the gage closing solenoid 245.

Also, as #4 hold relay 361 is energized it closes contacts 382 and 383. This now keeps relay 361 energized by circuit from plus 353 through contacts 350 through contacts 383 to minus 381. Also, from plus 362 through trip #3 switch contacts 238 through contacts 382 to minus 381 (see Fig. 19).

When #3 trip solenoid 355 is de-energized, clutch bar 358 is released a concealed spring in box 357 forces the clutch bar upwards and inclined plane 357a on bar 356 strips the clutch pin from notch 360 as the shaft 214 completes 360° cycle (see Fig. 15).

Also when clutch solenoid 133 is de-energized releasing pull on the bar 159, the compressed spring 153 pushes against the sprocket 142 which pushes rods 151 to the right in Fig. 11 to engage with pins 154 attached to the gear 152 which turns the shaft 155 and wheel 156, also the gear 158 and shaft 157, and wheel 140 and in turn through sprocket chain 384, turning the wheels 182 and 183.

The chain 384 is best shown in Fig. 13 where the chain 384 extends between sprocket wheels 385 and 386 and drives the gears 158 and 387 and the shafts 157 and 155 in first set of driving rollers 140—156 and the shafts 388 and 389 in the second set of driving rollers 182—183.

Then the belt section having the front end punched off will move to the left. As the belt starts to move to the left and passes off the punching table 248 (Fig. 17), it trips the hammer switch 233, establishing circuit from plus 402 through the solenoid 403 of the hammer relay 404 to normally closed contacts 405 of the hammer hold relay 407 back to minus 406.

When the hammer solenoid 403 is energized it closes contacts 408 establishing circuit from plus 409 through hammer solenoid 230 to minus 410.

The hammer 236, carried by the hammer arm 236a, is shown in Figs. 15, 16 and 17 and it is pivotally mounted at 412 and is actuated by the solenoid bar 231 which extends through the solenoid 230. The solenoid 230 is mounted on the table 413.

When the hammer 236 is moved downwardly by the solenoid 230, it strikes the punched point end C of the front end of the belt and removes any adhering excess fibres and pieces which were not separated by punch press die 220 at position VI.

When the hammer has reached downward position it releases the hammer motion switch 414 (Figs. 17 and 23) and closes the contacts of said switch. This establishes circuit from plus 402 to minus 415 through the solenoid 416 of hammer hold relay 407. This opens the contact 405 which breaks the circuit from plus 402 through contacts 233, solenoid 403 and contacts 405 to minus 406.

At the same time, the contacts 408 will be opened breaking contacts to solenoid 230.

The spring 417 of Figs. 15 and 17 will pull the hammer 236 up to its initial position.

In addition, the contacts 418 of relay 407 in Fig. 23 close and establish the circuit from plus 402 through contacts 233 and solenoid 416 to minus 419. At this stage the closed contacts 418 will hold the relay 407 in closed position.

The point end C of the belt section of Fig. 1 enters the bevelling machine VII of Figs. 2 and 3.

The bevelling machine VII is travelling more rapidly than rollers 182 and 183 and the ratchets 181 and 181a will permit rollers 182 and 183 to turn more rapidly.

The belt will be rapidly drawn through the bevelling or edge procedure by the rollers 271 (see Figs. 2 and 3).

As the belt moves into the bevelling machine, it passes off and releases the conditional and hold switch contacts 176a which opens the circuit of the conditional hold relay 353.

The belt will also pass from under the trip switch 238 releasing the relay 361 and then the circuit of Fig. 19 will go back to neutral or initial position.

After the belt passes from under the trip switch 238 of Fig. 19, it passes from over the hammer switch 233 and releases the hammer hold relay 407 and the circuit of Fig. 23 goes back to neutral.

In Fig. 20, the trip switch 122 will contact the belt section first (see Figs. 9, 10 and 20). The belt will open the contacts of the trip switch.

Then the belt moves up to the conditional and hold switch 175 (see Figs. 4, 5, 13 and 20) which is normally open, but which will be closed by the movement of the belt. The switch 175, as shown in Fig. 13, has an arm which projects up through the slot 175a in runway 175b.

When the switch 175 closes, it closes the circuit from minus 430 through contacts 431 of hold relay 432 to solenoid 433 to plus 434.

This will close contacts 435 establishing circuit from minus 436 through measuring solenoid 174 (see Fig. 13) to plus 438.

This will move rack 170 upwardly since solenoid 174 will cause the gear 173 to mesh with the rack 170.

In sequence the back end of the belt will pass the trip switch 122 permitting it to close and energizing the coil 439 of the trip relay 440, establishing the circuit from plus 441 through trip switch 122, through line 442 to coil 439 through line 443 through contacts 444 which are normally closed.

Then the circuit goes back through the line 445 through conditional and hold switch 175 to minus 430.

When the relay 440 is energized it closes contact 446 establishing circuit from plus 447 through gauge solenoid 132 to minus 452 (see Figs. 9, 11 and 20).

In addition the circuit goes through solenoid relay 448 having coil 449 to minus 450.

The gauge motion switch 453 (see Figs. 4, 5, 9, 20) will be operated by motion of the closing of the gauge which will be of the same construction and operation as shown at 239 to 244 in Fig. 16.

When gauge motion switch 453 closes it establishes circuit to clutch trip solenoid 131 (Fig. 9) which operates as arrangement 355 to 360 of Fig. 15.

When solenoid relay 448 is energized it closes contacts 454 and energizes clutch solenoid 133 and brake solenoid 195 through lines 455 and 456.

This clutch 133 and brake solenoid 195 operate the same for both the front end and back end punch presses.

At this point the belt has been stopped, the gauge has centered the belt under the die 109 of the punch press of Fig. 9, and the trip solenoid has released the clutch of the punch press of Fig. 9.

As the punch press of Fig. 9 cycles, the cam 110 on shaft 103 operates lever 111, closing the top switch 112, establishing circuit through hold relay 432 from plus 457, coil 458, line 459 to minus 460.

In Fig. 20 there is also shown the measuring switch 172, which is also shown in Figs. 5 and 14, which is actuated by the cam 171 to close switch 172 after the rack has moved upwardly a predetermined distance re-measuring the length of the belt.

The measuring switch 172 acts in parallel with the trip switch 122 so that whichever one is closed first it will trip the circuit.

When the top switch 112 is closed, it energizes hold relay 432 opening contacts 431 and 444 and closing contacts 461, which holds the relay 432 closed from plus 457 through line 445 to minus 430.

As the punch press at position IV is cycling, the switch 130 with the arm 130a contacts the pin 130b and is raised, closing the switch 130 (see Figs. 9, 11, 22).

The top switch 130 will energize the coil 475 of the solenoid relay 476. This will close contacts 477 establishing a momentary circuit from plus 478 through flipper solenoid 115 (see Figs. 10 and 22) to minus 480.

The momentary action is due to rapid passage of pin 130b under lever 130a which quickly closes and opens the contacts 130, which speeds the flipper cup 121 backwardly and forwardly.

Referring to Fig. 10 the flipper is pivotally mounted at 118 on bracket 119 (see Figs. 9 and 10), and the downturned lip of the cup 121 will sweep away the cut off excess from the back end of the belt.

The stop 121a will limit return movement of the flipper cup 121 under action of the return spring 121b.

After the flipper operation of Fig. 21, the switch 112 of Figs. 9, 11 and 20, having closed, energizes the hold relay 432 and opens the contacts 431 and 444 and closes contacts 461. When contact 431 opens, it opens the circuit to solenoid relay 433a of Fig. 20, which opens contacts 435 which opens circuit to measuring solenoid 174 allowing rack 170 to fall to its initial bottom position.

When contact 444 opens, it opens the circuit to the trip relay 440 which opens contacts 446 and breaks the circuit to the gauge solenoid 132, the trip solenoid 131 and the solenoid relay 448.

When the solenoid 448 is de-energized it opens contacts 454 which breaks the circuit to clutch solenoid 133 and brake solenoid 195.

Then the clutch is returned to position to stop the punch press cycle at position IV.

The belt section starts to move from under the punch press and when the back end passes off the conditional hold switch 175 the contacts 175 will be opened breaking the circuit to relay 432, and the circuit of Fig. 20 is restored to normal.

The alternative stripping arrangement of Fig. 18 involves a solenoid 260 which is set up in the same circuit as Fig. 22 and applied on the front end punch press of position VI of Fig. 17.

In place of the hammer mechanism the solenoid 260 of Fig. 18 will operate the fingers 263 to pull off the excess front end punched off pieces and throw them off the table 248 of the punch press of Fig. 17.

In the stamping section circuit of Fig. 21 the belt will move over the arm 18a of the trip switch 18 and opens this switch 18.

The belt then moves to the conditional and hold switch arm 114a mounted in the switch 114 (see Fig. 7) and closes the contacts of the switch 114.

When the back end of the belt clears the trip switch 18 it energizes the coil 490 of the trip relay 491 closing the contacts 492 and energizing the trip solenoid 82 (Figs. 6, 8 and 21).

This will pull bar 81 and the clutch element 77 into engagement with clutch element 76 against force of the spring 76a making shaft 38 rotate (see Figs. 6, 7 and 8).

As shaft 38 rotates, it rotates the top shaft 29 through meshing gears 31 and 40 and this rotates the stamp roller 35 in Fig. 8 and the counter roller 28.

As the stamps 36 and 37 pass the inking rollers 36a they will be inked and will transfer ink to the belt passing between the two rollers 28 and 35 in Fig. 8.

The stamp roller 35 in Fig. 8 may be electrically heated to burn or transfer foil printing to the belt.

The ink roller 36a is pressed against the stamp roller 38 by the slide 36b having the guides 36c and spring load 36d.

As the bottom shaft 38 rotates it causes cam 84a of Fig. 6 to actuate the lever arm 84 of the hold set switch 85 (see Figs. 6 and 21) and closes the switch contacts.

The closure of contacts 85 energizes coil 493 of hold relay 494 which closes contacts 495 and opens contacts 496.

When contacts 496 are opened they de-energize the trip relay 491 opening contacts 492 and said contacts de-energize the trip solenoid 82.

Contact 495 maintains coil 493 in energized condition until the back end of the belt passes off the hold switch allowing it to open.

Then the opening of the contacts 114 of the hold switch de-energizes the whole relay 494 and the circuit goes back to normal position.

The clutch 75—75a as shown in Fig. 6 is used for any additional embossing or stamping operation which may be included in the process.

The clutch 75—75a may be operated in the same manner as clutch 76—77, or it may be held closed by manual setting for continuous operation.

To summarize, the belt first passes through the embossing rolls 12 and 13, which are operated continuously from motor 44 through 42 and flywheel 41 as shown by arrow 14, without electrical controls.

Then the stamping operation is controlled by the closing of the trip switch 18 and the closing of the conditional and hold switch 114, which are arranged in opposite sides of the stamping rollers 28 and 38.

This stamping operation results when clutch 76—77 is operated by solenoid 82 from trip and hold relays 491 and 494. This stamping operation is started when the rear end of the belt passes off the trip switch 18. The stamping operation is automatically stopped after one cycle.

Then the rear end punch at position IV is controlled by trip switch 122 and conditional and hold switch 175, both of which must be closed for the punch press to operate. When the back end of the belt passes off the trip switch 122, the switch closes and starts the rear end punch operation.

The rear end punch is stopped by the top switch 112 which releases the clutch bar which will stop the operation after 360° movement of the crankshaft of the punch press of Fig. 9.

The feed rollers 140 and 156 beyond the punch press IV are stopped when the belt is in proper position to have its rear end punched and will be stopped throughout the punch press operation.

The belt will be advanced to this rear punch position by the roller 113 as well as the rollers 140 and 156. The rollers 113 are driven from the gearing 113a.

Then when the rear end punching is finished, the rolls 140 and 156 and the rolls 182 and 183 are started and move the belt to the front end punch position VI. Both pairs of rolls 140—156 and 182—183 are stopped again.

The rolls 140—156 and 182—183 are driven through the clutch arrangement 151—154 of Fig. 11 with solenoid 133 actuating the chain drive arrangement 384.

Then the belt passes to the bevelling operation.

The substantial control of the stamping operation at position III is provided by the conditional and hold switch 85 of Fig. 6 and the trip switch 18 of Fig. 17.

Similarly at the back punch the essential control is provided by the conditional and hold switch 175 of Fig. 9 and the trip switch 122 of Fig. 9.

It will be noted that there are two of these switches for each of the important operations, namely the stamping operation which takes place at position III, the back punching operation which takes place at position IV, and the front punching operation which takes place at position VI.

In general the conditional and hold switches require that the belt be present in position to be operated on by the stamping or punching mechanisms and that the belt clear the switch to allow the control circuit to reset to neutral.

After the belt is finished by this machine, it undergoes a final polishing or edge-finishing operation. After bevelling, the belt may also be subjected to a skiving operation.

To summarize, the belt is first fed between the embossing rollers 12 and 13 of Fig. 7, which are driven by belts 42 from the motor 43. The feed to rollers 12 and 13 may be made by hand or automatic.

Then the belt passes to between the upper counter roller 28 and the lower stamping roller 37.

In passing, the belt first acts on the micro trip switch 18 with the lever 18a, the contacts of which are kept open until the back end of the belt clears.

The rollers 28 and 37 are driven by the gear train 49, 50, 51, 52, 53, 54 and 55 through clutch 76 and 76a.

The stamping roller 37 is inked by the inking roller 36a.

The conditional and hold switch 114 is closed by the front end of the belt passing rollers 28 and 37.

The driving rollers 113 will continue the feed of the belt beyond the stamping rollers 28 and 37 and the rollers 113 are driven by gears 113a from the sprocket 50b, the chain 50a and the sprockets 50c (see Fig. 6).

When the back end of the belt clears the trip switch 18, the contacts close, making the circuit to the solenoid 82 of Fig. 6, actuating the clutch 76—76a and the stamping rollers are set in motion.

When the back end of the belt clears the switch 114, the stamping circuit of Fig. 21 is reset to neutral position, ready to receive another belt.

Next, the front end of the belt passes over back end trip switch 122 of Fig. 9, opening the contacts thereof.

Then the front end of the belt passes between rollers 140 and 156 and then goes over the conditional hold switch 175 and closes it. This closure sets measuring rack 170 in operation.

The measuring rack 170 will then be moved upwardly by gear 173 which is measured with the rack by solenoid 174. The rack 170 will move upwardly until cam 171 trips switch 172.

If the back end of the belt passes the trip 122 before cam 171 trips switch 172, it will trip back end punch press IV and start punch operation.

Otherwise the contact of switch 172 with cam 171 will set the punch press in operation.

As soon as the clutch of punch press IV is operated, feed rollers 140 and 156 will be stopped by solenoid 133, pulling clutch press 151 from contact with clutch press 154.

Then the brake solenoid 196 strikes the belt and stops it instantaneously from forward motion due to operation of solenoid 195, as indicated in circuits of Figs. 19 and 20.

After the brake end punch press is completed, the rollers 140 and 156 will be started by release of solenoid 133, allowing pins 151 to come into contact with pins 154.

The switch 112 sets the hold relay 432 of Fig. 20 to hold the break of circuits to the clutch solenoid 131 and clutch solenoid 133 and brake solenoid 195 and measuring solenoid 174.

The switch 130 operates sweep of Fig. 10 by actuating the solenoid 115.

The belt will then pass off the conditional and hold switch 175, resetting the circuit of Fig. 20 to neutral. The belt has already passed off the trip switch 122 at the time of the measuring operation.

Then the belt passes over the front end conditional and hold switch 176 to close it. This closure will close relay 353 of Fig. 19 and set up the circuit ready for front end punch operation at position VI.

The belt is being progressed by rollers 182 and 183 driven by chain 384 (see Fig. 13).

Then the belt passes under the front end trip switch 238 and closes it, resulting in punch press operation, actuating solenoid 355 and also operating clutch solenoid 133 to stop feed rollers 140—156 and 182—183 and operating brake solenoid 196.

Then front punch VI operates, operating the switch 216, which closes hold relay 361 of Fig. 19. This relay 361 releases punch press clutch solenoid 355, clutch solenoid 133 and brake solenoid 196.

The belt then is moved by rollers 182—183 until it touches the hammer switch 233 of Fig. 17 which actuates solenoid 230.

Solenoid 230 of Fig. 17 will actuate the hammer switch 236 and knock off any excess still attached to the belt. The belt then enters bevelling or edge-trimming section VII.

As the belt moves, it will release front end conditional and hold switch 176 and then the trip switch 238 and then the circuit of Fig. 19 reverts to neutral.

The bevelling operation VII will pull the belt through more quickly than the rollers 182—183 are being driven because of ratchet 181 and 181a. The rollers 182—183 then speed up.

Where a condenser switch system is used, the first condenser will be placed before embossing rollers 12 and 13 and will be loaded by a switch. The loading will continue as long as the belt is passing by or over the switch.

As soon as the belt clears the switch, the voltage built up in the condenser will be released, discharging the condenser to a voltage reader.

The voltage reader transfers the reading to the second condenser placed in position instead of the measuring rack.

As the same belt passes by the switch of the measuring condenser, it loads the same and as soon as the voltage charge hits the level of the first condenser, it discharges, actuating a switch which operates instead of trip switch 122.

The stamping operation at III may be done by a front press positioned between position IV and position V and operate simultaneously with back punch press at IV. This stamping may also be done by a reciprocating solenoid or an air-operating press.

Having now particularly described and ascertained the nature of the invention, and in what manner the same is to be performed, what is claimed is:

1. A machine for making belts of the type having time sequential embossing, stamping, back punching, measuring, front punching and bevelling positions, and also including means for moving the belt strip, means for embossing the belt strip whilst it is being moved, stamping means acting on the moving belt strip after embossing, means to stop the movement of the belt strip after embossing and stamping preparatory to punching means to back punch the belt strip, means to measure the length of the strip after back punching, means to front punch the belt strip after said back punching and measuring and final means to move the belt after front and back punching and means to bevel the belt during said final movement.

2. A machine for making belts of the type having time sequential embossing, stamping, back punching, measuring, front punching and bevelling positions, said belt being stopped in back punching and front punching positions and being moved continuously through the embossing, stamping and bevelling positions, and also including means for moving the belt strip, means for embossing the belt strip whilst it is being moved, stamping means acting on the moving belt strip after embossing, means to stop the movement of the belt strip after embossing and stamping preparatory to punching means to back punch the belt strip, means to measure the length of the strip after back punching, means to front punch the belt strip after said back punching and measuring and final means to move the belt after front and back punching and means to bevel the belt during said final movement.

3. A machine for making belts of the type having time sequential embossing, stamping, back punching, measuring, front punching and bevelling positions, said belt being moved at a low rate of speed through the embossing, stamping and punching operations and at a high rate of speed through the bevelling operation, and also including means for moving the belt strip, means for embossing the belt strip whilst it is being moved, stamping means acting on the moving belt strip after embossing, means to stop the movement of the belt strip after embossing and stamping preparatory to punching means to back punch the belt strip, means to measure the length of the strip after back punching, means to front punch the belt strip after said back punching and measuring and final means to move the belt after front and back punching and means to bevel the belt during said final movement.

4. A machine for making belts comprising in sequence means for embossing, stamping, back punching, measuring, front punching and bevelling belts, said machine being provided with lateral centering means at each punching means and with a lengthwise measuring means, solenoids operating said centering and punching means and switches actuated by movement of said belt to actuate said solenoids, and also including means for moving the belt strip, means for embossing the belt strip whilst it is being moved, stamping means acting on the moving belt strip after embossing, means to stop the movement of the belt strip after embossing and stamping preparatory to punching means to back punch the belt strip, means to measure the length of the strip after back punching, means to front punch the belt strip after said back punching and measuring and final means to move the belt after front and back punching and means to bevel the belt during said final movement.

5. A machine for making belts comprising in sequence means for embossing, stamping, back punching, measuring, front punching and bevelling belts, said stamping, back punching and front punching positions being provided with conditional and hold switches and trip switches to hold the belt in position for said operations, said machine being provided with lateral centering means at each punching means and with a lengthwise measuring means, solenoids operating said centering and punching means and switches actuated by movement of said belt to actuate said solenoids, and also including means for moving the belt strip, means for embossing the belt strip whilst it is being moved, stamping means acting on the moving belt strip after embossing, means to stop the movement of the belt strip after embossing and stamping preparatory to punching means to back punch the belt strip, means to measure the length of the strip after back punching, means to front punch the belt strip after said back punching and measuring and final means to move the belt after front and back punching and means to bevel the belt during said final movement.

6. A machine for making belts comprising in sequence means for embossing, stamping, back punching, measuring, front punching and bevelling belts, there being provided between the back punching and front punching means a plurality of feed rollers and means for disconnecting said feed rollers during the back punching and front punching operations, said machine being provided with lateral centering means at each punching means and with a lengthwise measuring means, solenoids operating said centering and punching means and switches actuated by movement of said belt to actuate said solenoids, and also including means for moving the belt strip, means for embossoing the belt strip whilst it is being moved, stamping means acting on the moving belt strip after embossing, means to stop the movement of the belt strip after embossing and stamping preparatory to punching means to back punch the belt strip, means to measure the length of the strip after back punching, means to front punch the belt strip after said back punching and measuring and final means to move the belt after front and back punching and means to bevel the belt during said final movement.

7. A machine for making belts comprising in sequence means for embossing, stamping, back punching, measuring, front punching and bevelling belts and means to control the cycling of the stamping, back punching and front punching operations so that only one cycle of the operations will take place, said machine being provided with lateral centering means at each punching means and with a lengthwise measuring means, solenoids operating said centering and punching means and switches actuated by movement of said belt to actuate said solenoids, and also including means for moving the belt strip, means for embossing the belt strip whilst it is being moved, stamping means acting on the moving belt strip after embossing, means to stop the movement of the belt strip after embossing and stamping preparatory to punching means to back punch the belt strip, means to measure the length of the strip after back punching, means to front punch the belt strip after said back punching and measuring and final means to move the belt after front and back punching and means to bevel the belt during said final movement.

8. A machine for making belts comprising in sequence means for embossing, stamping, back punching, measuring, front punching and bevelling belts, said back punching and front punching means being each provided with multiple action top switches for controlling the cycling, and clutch means arranged to limit the cycle of the back punching and front punching to one cycle each, said machine being provided with lateral centering means at each punching means and with a lengthwise measuring means, solenoids operating said centering and punching means and switches actuated by movement of said belt to actuate said solenoids, and also including means for moving the belt strip, means for embossing the belt strip whilst it is being moved, stamping means acting on the moving belt strip after embossing, means to stop the movement of the belt strip after embossing and stamping preparatory to punching means to back punch the belt strip, means to measure the length of the strip after back punching, means to front punch the belt strip after said back punching and measuring and final means to move the belt after front and back punching and means to bevel the belt during said final movement.

9. In a belt making machine a combination sequential back punch and front punch mechanisms, said machine being provided with lateral centering means at each punching means and with a lengthwise measuring means, solenoids operating said centering and punching means and switches actuated by movement of said belt to actuate said solenoids, and also including means for moving the belt strip, means for embossing the belt strip whilst it is being moved, stamping means acting on the moving belt strip after embossing, means to stop the movement of the belt strip after embossing and stamping preparatory to punching means to back punch the belt strip, means to measure the length of the strip after back punching, means to front punch the belt strip after said back punching and measuring and final means to move the belt after front and back punching and means to bevel the belt during said final movement.

10. In a belt making machine a combination sequential back punch and front punch mechanisms and a measuring means positioned between the back punch and front punch mechanisms to control the length of the belt, said machine being provided with lateral centering means at each punching means and with a lengthwise measuring means, solenoids operating said centering and punching means and switches actuated by movement of said belt to actuate said solenoids, and also including means for moving the belt strip, means for embossing the belt strip whilst it is being moved, stamping means acting on the moving belt strip after embossing, means to stop the movement of the belt strip after embossing and stamping preparatory to punching means to back punch the belt strip, means to measure the length of the strip after back punching, means to front punch the belt strip after said back punching and measuring and final means to move the belt after front and back punching and means to bevel the belt during said final movement.

11. In a belt making machine a combination sequential back punch and front punch mechanisms and conditional and hold and trip switches associated with each of the punch mechanisms to control the belt positions, said machine being provided with lateral centering means at each punching means and with a lengthwise measuring means, solenoids operating said centering and punching means and switches actuated by movement of said belt to actuate said solenoids, and also including means for moving the belt strip, means for embossing the belt strip whilst it is being moved, stamping means acting on the moving belt strip after embossing, means to stop the movement of the belt strip after embossing and stamping preparatory to punching means to back punch the belt strip, means to measure the length of the strip after back punching, means to front punch the belt strip after said pack punching and measuring and final means to move the belt after front and back punching and means to bevel the belt during said final movement.

12. In a continuous embossing, back stamping, punching, resizing, bevelling and centering belt processing machine of the type having sequentially arranged positions provided with successive means for embossing, stamping, back punching, measuring, front punching and bevelling the belt, a centering arrangement including a punch press, a centering gage to center the belt below the punch press having a downwardly moving punch, said gage having a fixed head against which the belt is centered a movable head to press the belt against said fixed head, a solenoid to move said movable head before the punch starts its downward movement and a back trip switch operated by movement of said belt to actuate said solenoid, said machine being provided with means to move the belt during stamping and embossing and means to hold the belt still during back punching and front punching and means to move the belt during bevelling.

13. The machine of claim 12, measuring means for measuring said belt lengthwise, including a reciprocating measuring rack, said rack having a measuring cam and a measuring switch, a pinion to drive said rack and a solenoid to drive said pinion and switch means to control the operation of said measuring means.

14. A machine for making belts comprising means for moving the belt strip, means for embossing the belt strip whilst it is being moved, stamping means acting on the moving belt strip after embossing, means to stop the movement of the belt strip after embossing and stamping preparatory to punching means to back punch the belt strip, means to measure the length of the strip after back punching, means to front punch the belt strip after said back punching and measuring and final means to move the belt after front and back punching and means to bevel the belt during said final movement.

15. A method of making belts comprising the steps of moving the belt strip while embossing said belt strip, then stamping said moving strip of belt material, stopping the movement of said belt strip, then back punching said belt strip, measuring said strip and then front punching said belt strip, and finally moving the belt strip while bevelling said belt strip.

16. The method of claim 15, the steps of centering the belt prior to the back punching and front punching operations.

References Cited in the file of this patent

UNITED STATES PATENTS

| Number | Name | Date |
| --- | --- | --- |
| 494,692 | Reece | Apr. 4, 1893 |
| 887,721 | Clark | May 12, 1908 |
| 950,482 | Hoberg | Mar. 1, 1910 |
| 1,044,713 | Wait | Nov. 19, 1912 |
| 1,158,864 | Schmidt | Nov. 2, 1915 |
| 1,347,305 | Taylor | July 20, 1920 |
| 1,443,160 | Woodings | Jan. 23, 1923 |
| 1,555,136 | Malaguti | Sept. 29, 1925 |
| 1,761,906 | Davy | June 3, 1930 |
| 1,943,409 | Ball | Jan. 16, 1934 |
| 2,341,462 | Matson | Feb. 8, 1944 |
| 2,568,373 | Sweet | Sept. 18, 1951 |